June 30, 1925.
V. F. DAVIS
1,543,988
FLUSH VALVE
Filed Aug. 1, 1923
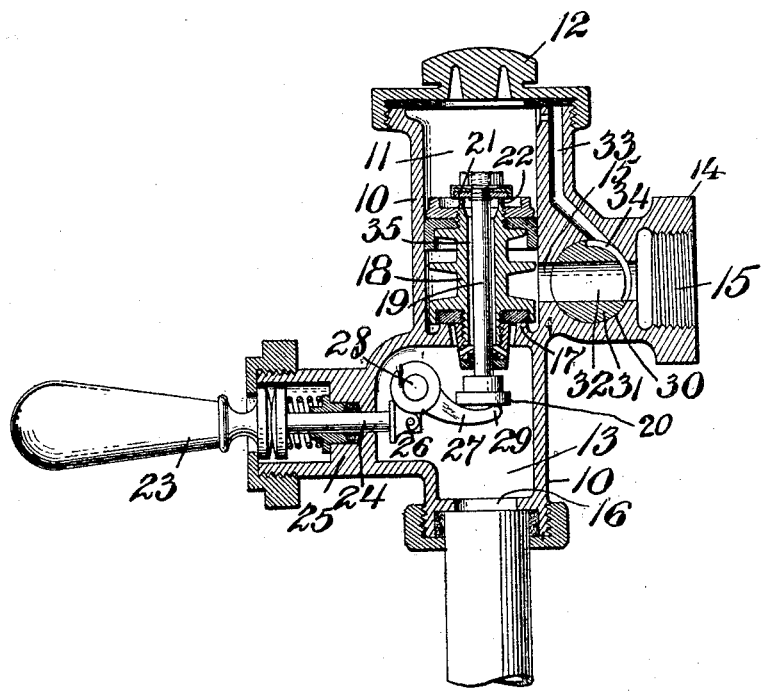
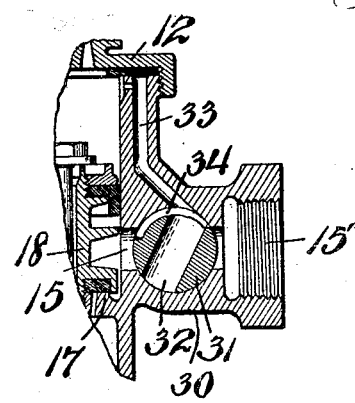
INVENTOR
Verner F. Davis,
BY
Wm H Caufield.
ATTORNEY.

Patented June 30, 1925.

1,543,988

UNITED STATES PATENT OFFICE.

VERNER F. DAVIS, OF WEST ORANGE, NEW JERSEY.

FLUSH VALVE.

Application filed August 1, 1923. Serial No. 655,051.

*To all whom it may concern:*

Be it known that I, VERNER F. DAVIS, a citizen of the United States, and a resident of West Orange, county of Essex, and State of New Jersey, have invented certain new and useful Improvements in Flush Valves, of which the following is a specification.

This invention relates to an improved flush valve and while it is adapted for different purposes it is particularly adapted for use on urinals and similar fixtures when a full flushing is sometimes desired and in others a slight stream is preferred.

The valve is designed to be promptly and positively closed when the quantity for which it is adjusted has passed through the valve.

In valves of this type as previously made when the inlet cock is partly closed to permit only a small flow for flushing the amount of water available to close the valve is likewise cut off to such an extent as to fail to close the valve. In my improved form the flow of water to close the valve is as steady and in sufficient quantity to close the valve when the stop cock is nearly shut as when it is nearly open. In other words the stop cock in any open position supplies substantially the same amount of water to the top of the valve mechanism to close it as when the valve is fully open and is only shut off when the cock is fully shut off.

The invention is illustrated in the accompanying drawings in which Figure 1 is a section of a valve made according to my invention and Figure 2 is a detail section of a part thereof showing the stop cock shut.

In the valve selected for illustration of my invention, I show a valve casing 10 with the valve chamber 11 being closed at the top as by the cover 12 and having at the bottom the chamber 13. At one side, the casing has a boss 14 for a pipe connection which boss has an inlet 15, which, with the valve chamber 11 and the outlet 16 form a passage for liquid through the valve. At the bottom of the valve chamber is the valve seat 17 which is adapted to be closed by any of the conventional forms of valve, but I illustrate a valve 18 to be normally on the seat 17 but adapted to be raised by means of the stem 19. The stem has a vertical movement limited by the head 20 in one direction and by the supplemental valve 21 which seats itself on the valve seat 22 to limit the movement in the other direction.

Any desired mechanism for manual opening of the valve can be used and for illustration I show the tilting handle 23 which engages the spring pressed rod 24 in the stuffing box 25, the rod in turn bearing on the short arm 26 of the bell-crank lever 27 which is pivoted as at 28 and the end 29 of which is under the head 20 of the stem 19. In the inlet 15 I arrange a stop-cock 30 which includes the plug 31 which has a passage 32 so that when the plug is turned the flow of water can be reduced or entirely shut off. A by-pass 33 is arranged in the valve casing so as to conduct water from the inlet 15 to the valve chamber 11 above the valve 18.

The invention in this case resides in so constructing this stop-cock that the cock does not interfere with the steady flow of liquid through the by-pass until the cock is shut. The reason for this flow is that under normal operation of a valve of this type when the cock 21 is turned to provide only a small flow of water when the valve 18 is raised, sufficient water must be fed above the valve 18 to insure its being closed again as it is returned to its seat by the water from the by-pass. To provide for such free and substantially steady supply to the by-pass 33 I show the plug 32 provided with a groove 34 which conducts water from the inlet to the by-pass in an even quantity until the cock is entirely shut as in Figure 2.

The valve 18 is raised by the handle 23 as above described, the stem rising first and allowing the water under pressure above the valve to flow out through the passage 35 and then the valve 18 is raised to clear the seat 17. Water is now flowing through the inlet 15 the chamber 13 and outlet 16 but the by-pass is also carrying water to the chamber 11 above the valve. If only a small dribble is used for flushing, the stop-cock 30 is nearly shut, and in the old forms of valves a long time would elapse before sufficient water would be accumulated to close the valve 18. To overcome this the groove 34 is arranged to insure a sufficient flow to the by-pass 33 even when the stop-cock is nearly turned off.

Of course it is desirable to shut off the by-pass when the water to the valve is shut off in order to permit adjustment or repairing.

The construction of the pet-cock is subject to change but the preferred form is that shown in which the groove or channel 34 working in the end of the by-pass tangential to the pet-cock plug 32 provides a cheap and easily assembled construction.

I claim.

1. A flush valve comprising a casing, a valve in the casing, the casing having a passage which the valve controls, and having a by-pass from the inlet of the passage to a point above the valve, a cock in the inlet to regulate the admission of fluid to the passage and to the by-pass the parts being constructed so that the flow through the by-pass is substantially constant until the cock is turned to closed position.

2. A flush valve comprising a casing having a valve chamber and an inlet port and having a by-pass from the inlet port to the valve casing, a cock having a plug controlling the passage of fluid through the inlet port and having a groove to permit a substantially constant flow of liquid through the by-pass at all open positions of the plug.

3. A flush valve comprising a casing having a valve chamber and an inlet port, a valve adapted to close the valve chamber and fitting in said chamber, an inlet pipe, the valve casing having a port to conduct water from the inlet pipe to the chamber below the valve and having a by-pass to conduct water to the valve chamber above the valve, and a single cock for graduating the amount of water admitted to the port and shutting off the by-pass when the port is closed.

In testimony that I claim the foregoing, I have hereto set my hand, this 16th day of July, 1923.

VERNER F. DAVIS.